(12) United States Patent
Bergmann et al.

(10) Patent No.: US 8,311,274 B2
(45) Date of Patent: Nov. 13, 2012

(54) IMAGE RECOGNITION SYSTEM

(75) Inventors: Stephan Bergmann, Muggensturm (DE); Ulrich Mohr, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 935 days.

(21) Appl. No.: 11/849,641

(22) Filed: Sep. 4, 2007

(65) Prior Publication Data

US 2008/0056535 A1    Mar. 6, 2008

(51) Int. Cl.
*G06K 9/00* (2006.01)
(52) U.S. Cl. .......................................... 382/103; 701/23
(58) Field of Classification Search .................. 382/100, 382/104, 105, 181, 190, 195, 199, 203, 206; 701/23, 24, 25, 200, 208, 213
See application file for complete search history.

(56) References Cited

U.S. PATENT DOCUMENTS

| 6,604,049 | B2 * | 8/2003 | Yokota | 701/213 |
| 6,836,724 | B2 * | 12/2004 | Becker et al. | 701/200 |
| 7,126,579 | B2 * | 10/2006 | Ritter | 345/156 |

FOREIGN PATENT DOCUMENTS

| EP | 1304607 A1 | 4/2003 |
| JP | 2005-98853 A | 4/2005 |
| JP | 2006-018688 | 1/2006 |
| JP | 2006-151014 | 6/2006 |
| JP | 2006-209511 A | 8/2006 |

OTHER PUBLICATIONS

F. Heimes, K. Fleischer and H. H. Nagel; Automatic Generation of Intersection Models from Digital Maps for Vision-Based Driving on Innercity Intersections; Oct. 3-5, 2000; pp. 498-503.
V. Gengenbach, H. H. Nagel, F. Heimes, G. Struck and H. Kollnig; Model-Based Recognition of Intersections and Lane Structures; Sep. 25, 1995, pp. 512-517.

* cited by examiner

*Primary Examiner* — Anand Bhatnagar
(74) *Attorney, Agent, or Firm* — The Eclipse Group LLP

(57) ABSTRACT

Methods, devices and systems for recognizing an object in an image are provided, in which the object is recognized by evaluation of both image data and digital map information that corresponds to an area represented by the image. Evaluation of the image data and the digital map information may involve various methods of evaluation including cross-checking, in which the digital map information is utilized to verify correct object recognition in the image data; prediction, in which digital map information is utilized to predict a feature of an object to facilitate object recognition in the image data; or modeling in which a generic model of an object is compared with the image data.

36 Claims, 10 Drawing Sheets

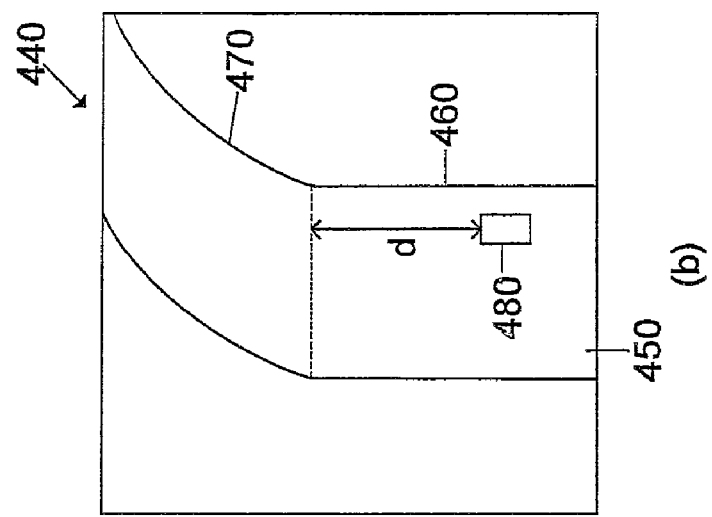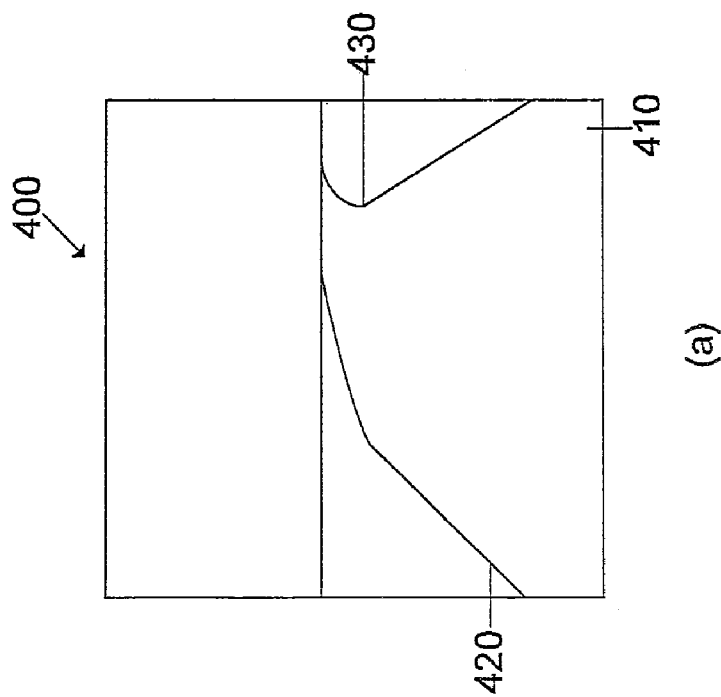
Fig. 4

IMAGE RECOGNITION SYSTEM

RELATED APPLICATIONS

This application claims priority of European Application Serial Number 06 018 335.7 filed Sep. 1, 2006, titled METHOD FOR RECOGNIZING AN OBJECT IN AN IMAGE AND IMAGE RECOGNITION DEVICE; which application is incorporated in its entirety by reference in this application.

BACKGROUND OF THE INVENTION

1. Field of the Invention

The invention relates to image recognition technology and, more particularly, to methods, devices, systems and assemblies in which an object is identified or recognized in an image. The invention may be particularly applicable to vehicle navigation systems that identify roadway objects and structures in an image of the roadway.

2. Related Art

Image recognition technology has been utilized in a number of different fields including, in particular, the automotive field. For example, vehicle navigation systems and systems that aid the driver in controlling a vehicle may advantageously include image recognition components. In such systems, images of the region around a vehicle may be recorded by a camera within the vehicle. These images may then be analyzed to identify objects, such as roads or road edges, which may be relevant for navigation or for controlling the vehicle. Reference to the terms "to identify an object" or "identifying an object" may include, for example, identifying an object type, identifying an object position or identifying any of a number of other object properties, such as, for example, object size or object orientation. Once an object has been identified or recognized in an image, specific processes may be initiated based upon the type and position of the recognized object. For example, the driver of a vehicle may be alerted to an upcoming junction or intersection once the junction or intersection has been identified in the image.

Methods and devices that are currently utilized for identifying or recognizing an object in an image are frequently slow and inaccurate. This can be particularly disadvantageous where the image is not just a single image, but instead a continuous series of images from a video camera, in which each of the images is analyzed. This may be the case, where a video camera is installed in a vehicle and a real-time stream of images is evaluated.

Thus, a need exists in the art for an image recognition system that has improved recognition accuracy and/or an enhanced recognition speed.

SUMMARY

Accordingly, in one example of an implementation, a method for recognizing an object in an image is provided. The method includes retrieving image data corresponding to the image and retrieving digital map information, where the digital map information may include map information for at least a portion of an area represented by the image. The digital map information may also include information on the object to be recognized in the image. The method further includes evaluating both the image data and the digital map information in order to recognize the object. The evaluating step may further include evaluating the image data to recognize the object and evaluating the digital map information to verify that the object has been correctly recognized. The evaluating step may also include evaluating the digital map information to obtain information on the object and then utilizing that information in evaluating the image data in order to facilitate recognition of the object in the image data. In other implementations, the evaluating step may include comparing a model of the object, based upon the digital map information, with the image data.

In another implementation, an image recognition device for recognizing an object in an image is provided. The device includes a memory unit for storing image data that corresponds to the image. The memory unit may also store digital map information that may include map information on at least a portion of an area represented by the image as well as information on the object to be recognized in the image. The device further includes a processing unit coupled to the memory unit, where the processing unit evaluates both the image data and the digital map information in order to recognize the object. The processing unit may evaluate the image data to recognize the object and evaluate the digital map information to verify that the object has been correctly recognized. The processing unit may further evaluate the digital map information to obtain information on the object and then utilize that information in evaluating the image data in order to facilitate recognition of the object in the image data. The processing unit may further compare a model of the object, based upon digital map information, with the image data.

In still another implementation, a navigation system that includes an image recognition device is provided. The image recognition device includes a memory unit for storing image data corresponding to the image and digital map information. The digital map information may include map information on at least a portion of an area represented by the image as well as information on the object to be recognized in the image. The image recognition device further includes a processing unit coupled to the memory unit, where the processing unit evaluates both the image data and the digital map information in order to recognize the object. The processing unit may evaluate the image data to recognize the object and evaluate the digital map information to verify that the object has been correctly recognized. Further, the processing unit may evaluate the digital map information to obtain information on the object and then utilize that information in evaluating the image data in order to facilitate recognition of the object in the image data. The processing unit may also compare a model of the object, based upon digital map information, with the image data.

In another implementation, a navigation system and image recognition device assembly is provided. The assembly includes a position determining device and an image recognition devise. The image recognition device is configured to evaluate both image data and digital map information to recognize an object in an image represented by the image data. The image recognition device is coupled to the position determining device to provide information on a relative position of the object to a current vehicle position and to provide information to recalibrate the position determining device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 3 is a representation of schematic views illustrating the evaluating of image data and digital map information according to an implementation of the present invention, in which FIG. 3a is an example schematic view of image data of a straight road segment; FIG. 3b is a corresponding example schematic view of digital map information; and FIG. 3c is an example schematic view illustrating the evaluation of image data based upon digital map information.

FIG. 4 is a representation of schematic views illustrating the evaluating of image data and digital map information according to an implementation of the invention, in which FIG. 4a is an example schematic view of image data of a road with a straight segment and a bend and FIG. 4b is a corresponding example schematic view of digital map information.

FIG. 5 is a representation of schematic views illustrating the evaluating of image data and digital map information according to an implementation of the invention, in which FIG. 5a is an example schematic view of image data of a road turnoff and FIG. 5b is a corresponding example schematic view of digital map information.

DETAILED DESCRIPTION

FIGS. 1-10 illustrate examples of various implementations of methods, devices, systems and assemblies in which an object is recognized in an image. Recognition of the object is achieved by evaluating information from image data corresponding to an image such as may be obtained with a camera and information from digital map data.

Figure 1:
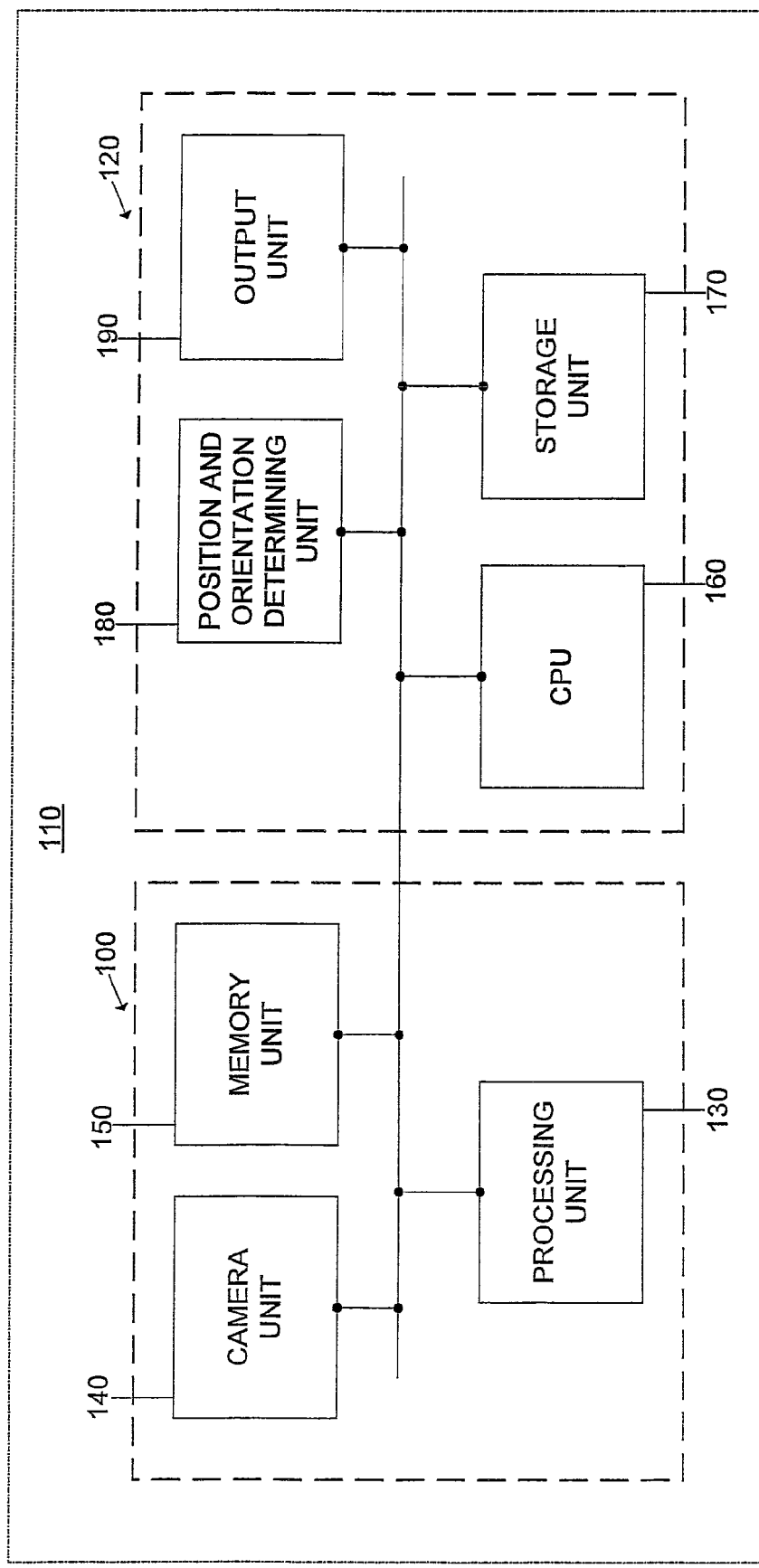
FIG. 1 is a schematic block diagram of an image recognition device and a navigation system that may be separate units coupled together or a single combined unit with components coupled together according to various implementations of the invention.

FIG. 1 is a schematic block diagram of an image recognition device 100 that may be coupled to a navigation system 120 according to an example of an implementation of the invention. It is also possible that the image recognition device 100 may be incorporated into a navigation system 120 in a combined navigation system and image recognition device 110 which is described in greater detail below. The image recognition device 100 includes processing unit 130, which may be, for example, any standard processor. The processing unit 130 is coupled both to an imaging device such as camera unit 140 and to memory unit 150. The camera unit 140 may be a camera that is essentially a still camera that provides single images or multiple images at relatively long time intervals such as 1 image per second or less or a video camera that provides images at very short time intervals such as, for example, 25 images per second. The memory unit 150 may be any suitable memory or storage unit that allows for both read and write accesses, such as RAM-type memories of DRAM or SRAM type or a hard disk. In various implementations, the storage capacity of memory unit 150 may be sufficient for storing at least one image provided by camera unit 140 as well as a portion of a digital map that corresponds to the region represented by the image.

In one example implementation, the image recognition device 100 may function to retrieve image data corresponding to the image; to retrieve digital map information on at least a portion of an area represented by the image and then to evaluate both the image data and the digital map information to recognize an object in the image. The image data may be retrieved directly from camera unit 140, which may be a video camera or a camera that provides images at relatively long time intervals. Alternatively, the image data obtained by camera unit 140 may stored in memory unit 150, which may be a memory unit or a storage unit in the image recognition device 100. The image data may then be retrieved from the memory unit 150 by the processing unit 130. Similarly, the digital map information may be retrieved from memory unit 150.

The image data and the digital map information may be stored in a single physical storage device, or in two or more different storage units. For example, both the image data and the digital map information that are retrieved by the processing unit 130 may be stored in memory unit 150. In other implementations, the image data may be stored in a first storage unit such as, for example memory unit 150 and the digital map information may be stored in a separate storage unit (not shown) in image recognition device 100 or in storage unit 170 of navigation system 120, or other system or component.

The processing unit 130 may evaluate the image data and the digital map information in order to recognize an object in the image. This may involve various methods of evaluation, including cross-checking in which the digital map information is utilized to verify correct object recognition in the image data; prediction in which digital map information is utilized to predict a feature of an object to facilitate object recognition in the image data; or modeling in which a generic model of an object is compared with the image data.

In one example, the processing unit 130 may perform the evaluation by cross-checking where the image data is first evaluated to obtain preliminary recognition of the object. The digital map information may include information on at least one property of the object and that property of the object may be identified in the image data and compared with the same property in the digital map information. The property of the object may be one or more of several properties such as, for example, position, shape and orientation of the object. Based upon the result of the comparison of the property of the object derived from the image data and the corresponding information in the digital map information, the object recognition may or may not be verified. If object recognition is verified, then, in various implementations, object recognition may be completed and other processes may or may not be initiated based upon the object recognition. However, if object recognition is not verified, i.e., if the digital map information is not consistent with the preliminarily identified object, then, in one example, the preliminarily identified object may be discarded and the object recognition process repeated. Comparison of the property of the object in image data and digital map information may be done by any standard algorithm known in the art. Thus, the term "evaluating the image data" may include the utilization of any standard algorithm including, for example, filtering the image data in various ways, such as by calculating the convolution of the image data and by use of a suitable filter. Further, the process may involve assigning probabilities that the preliminarily recognized object is in fact the object to be recognized, based upon the results of the comparison.

In another example, the processing unit 130 may perform the evaluation by predicting where the digital map information is employed to facilitate recognition of the object in the image data. This may involve providing predictive information on at least one property of the object based upon information in the digital map information and then focusing the evaluation of the image data on objects having the predicted information. The property of the object may be one or more of several properties including, for example, position, shape and orientation of the object in the image as well as other properties. By way of example, the property of the object in the digital map information may be the position of the object and this may be used to restrict the evaluation of the image data to a sub-portion or a specific region of the image data corresponding to the position in which the object occurs in the digital map information. The digital map information may thus be utilized to narrow the portion of the image that is searched for the object and to predict the likelihood that specific types of objects, such as roads, lane markers, road junctions or road crossings may be found in the specific portions of the image searched. In such instances, it may be sufficient to analyze only those portions of the image in which the particular object is likely to be found. Further, the information on the object in the digital map information may also include information on shape and/or orientation, and the evaluation of the image data may be restricted to identifying objects having shapes and/or orientations similar to that of the object to be identified. By utilizing the digital map information to predict the shape and/or orientation of the object in the image, structures that have totally different shapes and/or orientations may be readily discarded when analyzing the image. The processing unit 130 may base its recognition upon predetermined threshold values that an object must exceed in order to be recognized. Further, the processing unit 130 may also assign probabilities that a particular structure in the image might be the object to be recognized.

In yet another example, evaluating by modeling may involve comparing a model of the object with the image data. The processing unit 130 may thus compare a model of the object with the image data to recognize the object. The data required for characterizing the model may also be stored in the memory unit 150, or, alternatively, in a separate storage unit (not shown). The model of the object may have at least one variable parameter, in which case the processing unit 130 may find an optimum or close to optimum value for the at least one variable parameter. Such variable parameters may include object shape, position, orientation or any other suitable property of the object that may be varied in the image. By providing generic models having at least one variable parameter for various object types, different structures in the image may be reliably recognized. For example, a straight section of a road may be modeled by a pair of essentially parallel straight lines which, in the perspective view of the image, would translate into a pair of converging lines. Specific parameters for a straight section of a road might include the width of the road and the offset position of the camera taking the image relative to the center of the road. The optimum value for the at least one variable parameter may be found using any suitable algorithm. In particular, if the analysis is to be performed on more than a single image, such as on a quasi-continuous stream of images recorded by a video camera where a structure is to be tracked once recognized, Bayes filtering or particle filtering may be employed in the recognition process.

FIG. 1 also illustrates a navigation system 120 coupled to the image recognition device 100. The navigation system 120 may provide, among other things, a source of digital map information for the image recognition device 100, although it is possible in other implementations, for digital map information to be provided from some other source (not shown). The navigation system 120 may include standard components that may be found in a navigation system, such as a central processing unit or CPU 160; a storage unit 170, which can be, for example, a CD-ROM, DVD, hard disk or any other suitable storage medium for storing a digital map; an input unit (not shown), such as a keypad, a touchscreen or a microphone; a position and orientation determining unit 180 for determining current vehicle position and orientation, which may include, for example, a GPS receiver and a gyroscopic device; and an output unit 190 that may provide optical or acoustical information to a driver and may include a display and/or a loudspeaker.

The position and orientation determining unit 180 of navigation system 120 determines the current vehicle position and orientation. The position and orientation determining unit 180 is coupled to the processing unit 130, which is adapted to select a portion of the digital map information based upon the current vehicle position and orientation. Thus, the current vehicle position and orientation may be utilized to identify the portion of a digital map that corresponds to the field of view shown by the image. It is also possible, in other implementations, that a dedicated position and orientation determining unit (not shown) be provided in the image recognition device 100.

As described above, the digital map information may be retrieved from a navigation system 120 that includes a digital map stored on a storage unit 170 (or that may obtain digital map information remotely, for example, via communications with a remote server). The digital map information stored in a navigation system may also include information on the shape and/or orientation of specific objects such as, for example, the orientation of individual road segments; however, for many other objects included in the digital map, such as traffic signs, the digital map information may include only a qualifier specifying the type of the object, such as for example, for a stop sign. It is to be understood that, even where a qualifier is stored, the digital map information at least implicitly includes information on the shape of the object, since the information on the object type stored in the digital map information may be combined with additional information to predict the shape of the object in the image.

As noted above, the navigation system 120 may include a position and orientation determining unit 180. The digital map information retrieved by processing unit 130 may, therefore, be based upon the current vehicle position and the current vehicle orientation. The vehicle position and the vehicle orientation are sufficient to predict where the camera is located in the map and, hence, that portion of the map corresponding to the field of view of the camera; provided, however, that the position and orientation of the camera relative to the longitudinal and transversal axes of the vehicle are known. Thus, using the position and orientation information, it is possible to retrieve only that portion of the digital map required for recognizing the object in the image.

In one example of an implementation, the image recognition device 100 may also provide information to the navigation system 120 based upon the results of recognizing the object. This may allow the results of the image recognition to be used for navigation purposes, such as for providing driving instructions to a driver, alerting a driver, or controlling the vehicle based upon the result information related to object recognition. For example, because image recognition may provide more accurate information on objects close to the vehicle than can map data, it is anticipated that more accurate driving instructions may be provided to the driver of the vehicle with respect to the roadway in the immediate vicinity of the vehicle. However, it is also anticipated that the results of recognizing the object in the image may be employed for a wide variety of other applications as well.

FIG. 1 also illustrates an implementation of a combined navigation system and image recognition device 110 in which the image recognition device 100 may be incorporated into a navigation system 120. Such a combined system may make digital map information present in the navigation system 120 readily accessible to the image recognition device 100 and the image recognition device 100 may also readily access information that is provided by other components of the navigation system, such as the position and orientation determining unit 180 that may include, for example, a GPS receiver or a gyroscopic device.

The navigation system 120 may include a storage unit 170 for storing a digital map, and the image recognition device 100 may be coupled to the storage unit 170 of the navigation system 120 to retrieve at least a portion of the digital map. In this case, the storage unit 170 of the navigation system 120 may be integrated with the memory unit 150 of the image recognition device 100. The navigation system 120 may further include an optical or acoustical output unit 120 for outputting driving instructions or warning signals to a driver, and the driving instructions or warning signals may be output in a manner dependent upon the object recognized by the image recognition device 100. For example, when the road on which the vehicle is presently traveling is recognized in the image recorded by a camera in the vehicle, it may be possible to ascertain whether the vehicle is approaching the edge of the road such as, for example, might be the case where the driver of the vehicle is falling asleep. In this case, a warning signal may be output to the driver.

The navigation system 120 may include a position and orientation determining unit 180 for determining a current vehicle position in which the image recognition device 100 provides information on a recognized object to the position and orientation determining unit 180. This may improve the accuracy in determining the position and orientation of the vehicle. This interaction of the image recognition device 100 and the position and orientation unit 180 may first involve the vehicle position and orientation determining unit 180 providing information to the image recognition device 100 to facilitate object recognition. Then, the object recognition information from the image recognition device 100 may be fed back into the position and orientation determining unit 180. For example, the image recognition device 100 might determine the distance of the vehicle from an object that is close to the vehicle with relatively high accuracy. It would then be possible to recalibrate the position and orientation determining unit 180, if needed, based upon the information on the recognized object provided by the image recognition device 100.

Figure 2:
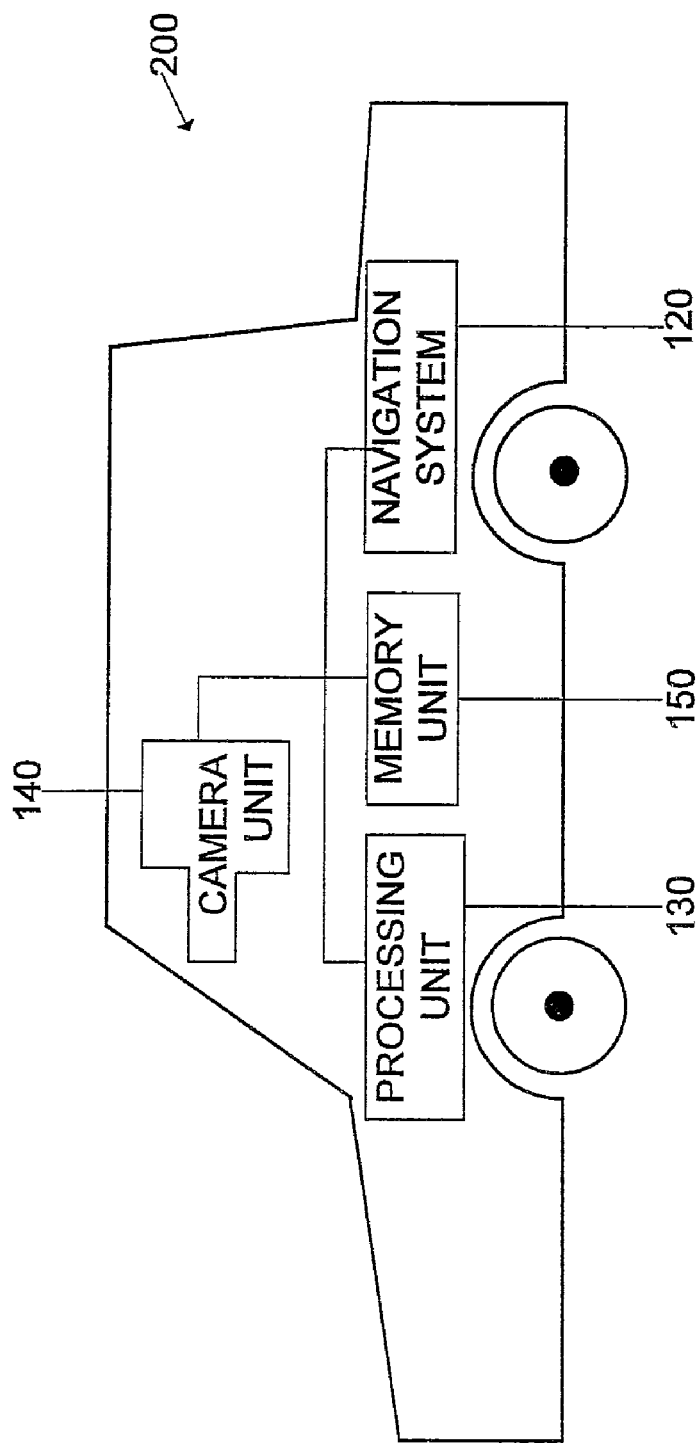
FIG. 2 is a schematic view of a car in which an image recognition device of FIG. 1 is installed.

FIG. 2 is a schematic view of a vehicle 200, such as a car, in which the components of an image recognition device 100 and navigation system 120 of FIG. 1 are installed. As illustrated in the FIG. 2, camera unit 140, which may be a video camera unit, may be installed at an elevated position within the vehicle close to an upper position of the windshield, such as close to the rear view mirror or the sun visor. Other components schematically shown in FIG. 1 may be installed in various positions in the vehicle although in some implementations, it may be desirable to install the components, close to or in the instrument panel. The position and orientation of the video camera identified in the figure as camera unit 140, may be chosen in such a way that, for characteristic road width, a substantial portion of the road on which the vehicle is driving, is imaged by the camera unit 140.

Figure 3:
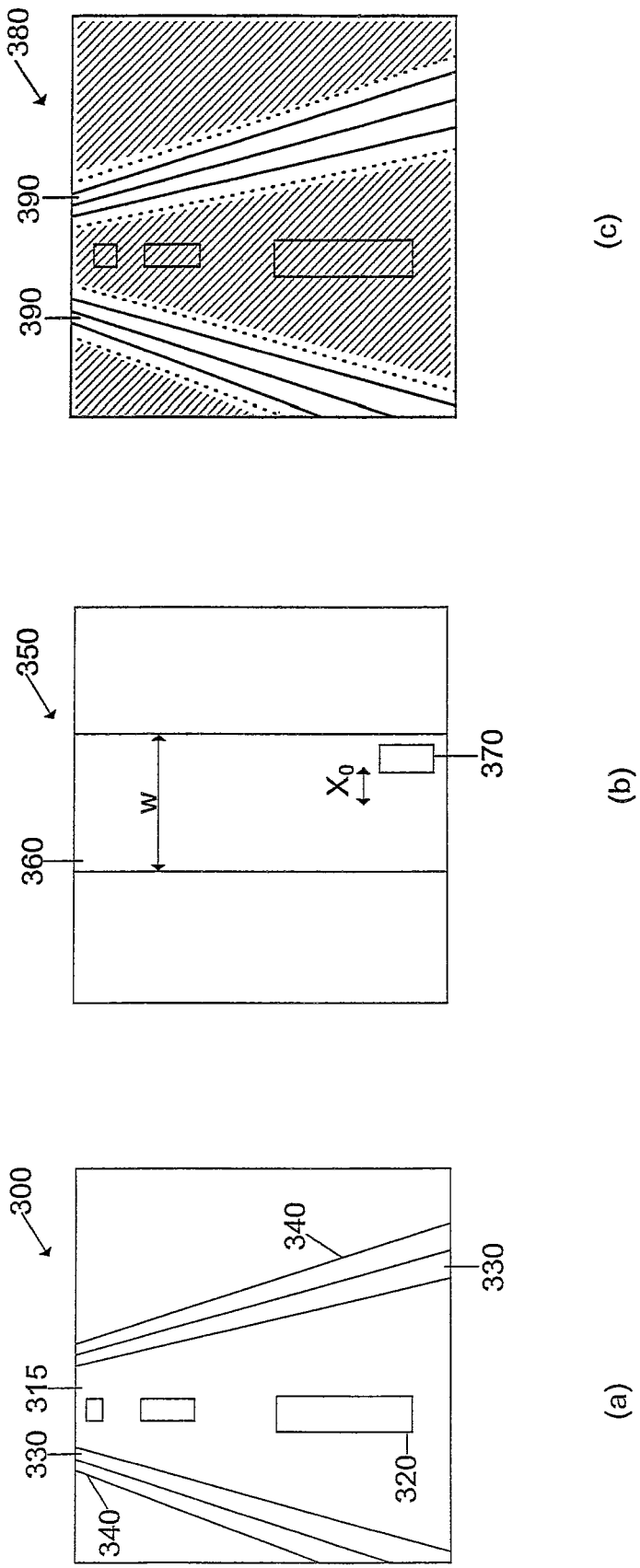
Figure 5:
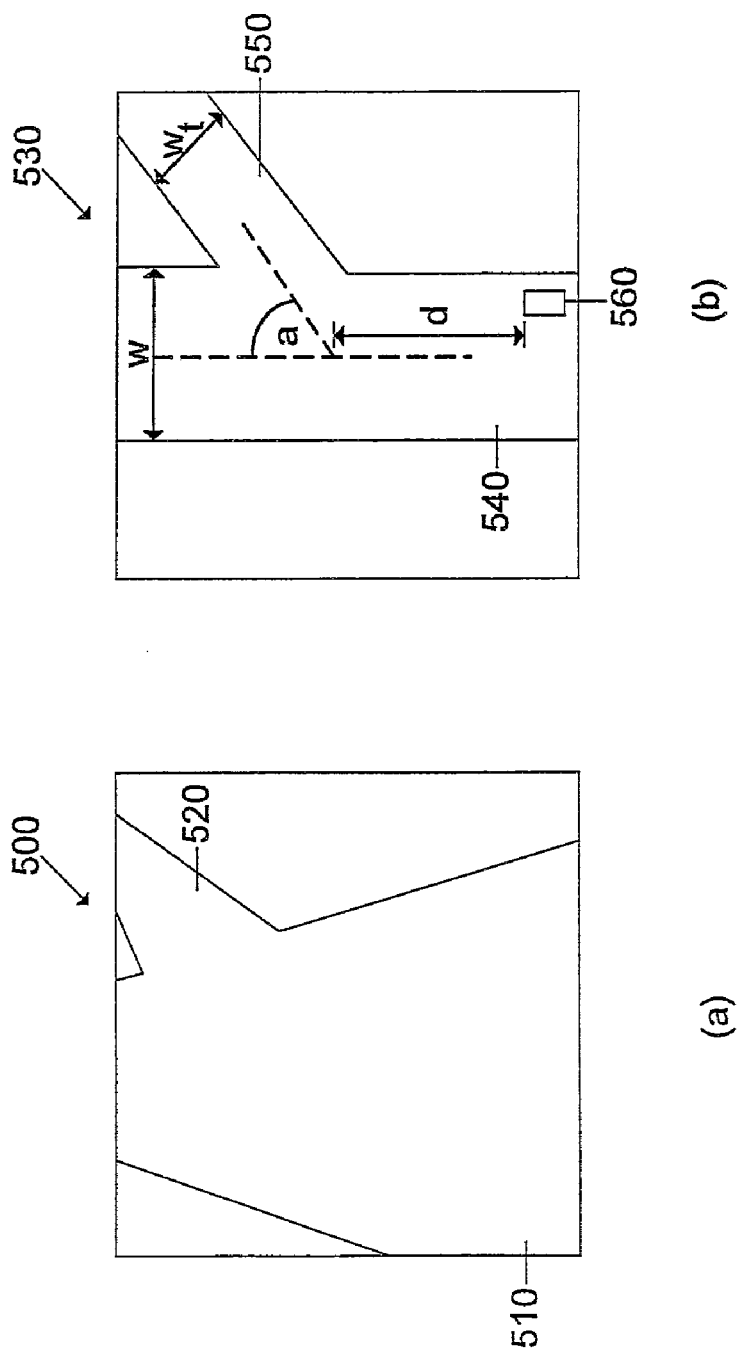

FIGS. 3-5 illustrate the evaluation of image data and digital map information in various implementations. In the "a" panels of FIGS. 3-5 (FIGS. 3a, 4a and 5a) example schematic images taken by camera unit 140 are shown and in the "b" panels (FIGS. 3b, 4b and 5b) the corresponding schematic digital map information is illustrated. In the "c" panel of FIG. 3 (FIG. 3c) a schematic illustration of the evaluation of image data and digital map information is shown in accordance with one implementation.

FIG. 3a illustrates an example schematic image 300 that is recorded by camera unit 140 when the vehicle is traveling on a straight road segment. Road segment 310 is laterally bounded by road edges 340. In addition, road markings 330 close to the road edges 340 and a central road marking 320 are present in the road segment 310. Typical tasks that may be performed in image recognition for image 300 may include identifying the road segment 310 itself, or specific structures contained in the image, such as the road edges 340 or the road markings 320 and 330. In addition, the present approach may also utilize information from a digital map in the imaging recognition process.

FIG. 3b schematically illustrates a portion 350 of a digital map corresponding to the field of view shown in the schematic image 300 of FIG. 3a for straight road segment 360. Based upon the output of the position and orientation determining unit 180 of the navigation system 120, it is possible to identify the position of the vehicle on the road segment 360, which is schematically indicated at 370 in FIG. 3b. It should be noted that FIG. 3b is only a schematic representation indicating the information that may be available from the digital map, since digital maps are typically stored in a form in which straight road segments are represented by vectors having a given starting point, orientation, and length, as well as additional attributes. In the case of more accurate maps, such as, for example, cadastral maps, the width w of the road segment may be explicitly stored in the digital map information. Assuming further that the uncertainty of the current vehicle position determined by the position and orientation determining unit 180 is small compared to the width w of the road segment 360, the output of the position and orientation determining unit 180 and the digital map information may be combined to provide an estimate for the offset $x_0$ of the vehicle relative to the center of the road segment. The values for the width w of road segment 360 and the offset $x_0$ may facilitate image recognition in image data.

FIG. 3c schematically illustrates the processing of information from the image data and digital map information that may be performed in various implementations. For example, the processing unit 130 of the image recognition device 100 may be adapted to identify the regions 390 in the image 300 in which specific elements indicating the road edge, such as the road edges 340 and the road markings 330, may be expected to be found based upon the width w of the road segment and the offset $x_0$. If both the offset $x_0$ and the road width w are precisely known, it would be possible to precisely predict the position of the road edge 340 in image 300 based upon simple geometrical optics relations that involve, among other things, the position of the camera unit 140 relative to the vehicle as well as the optical characteristics of the camera unit 140, such as its focal length. However, even when neither the width w of road segment 360 nor the offset $x_0$ are precisely known, it is still possible for the processing unit 130 to determine specific regions in the image data in which the road edges are likely to be found using evaluation methods described below and illustrated in FIG. 3c.

Two example modes of operation for evaluating image data and digital map information illustrate the process of image recognition in connection with FIG. 3, although other modes of operation and methods of evaluation are possible and discussed elsewhere in this document and still others would be apparent to the skilled art.

In one mode of operation, discussed in greater detail in connection with FIGS. 6 and 7, the processing unit 130 analyzes the full image data 120 using conventional methods to preliminarily identify objects such as road edges 340 and road markings 330. As noted above, the term "identifying an object" may include such things as identifying an object type and/or identifying an object position in the image. Conventional methods of identification might involve identifying the road segment 310, itself, or specific structures contained in the image, such as the road edges 340 or the road markings 320 and 330. Such identifying might be performed by analyzing the full image 300 in as much as the structures in image 300 have specific geometries, such as straight lines. The task may be facilitated by manipulating image 300 in various ways, for example by filtering the image data. Thus, to render vertical structures (with respect to the drawing orientation) more clearly visible, a grayscale representation of the image may be convoluted with a specific filtering function, such as the second derivative of a Gaussian curve in the horizontal direction. After such filtering, vertical structures such as the road markings 320 and 330 and road edges 340 may be more clearly visible and may be more readily identified. By performing such procedures as described above, road markings and road edges may be preliminarily identified and their position in the image may be preliminarily determined.

This preliminary identification of objects may then be verified against the digital map information. For this purpose, the position of the preliminarily identified road edges and road markings are compared with the regions 390 in which such objects are expected to be located based upon the digital map information. Objects that are found to lie outside regions 390 are discarded. Therefore, in the first mode of operation, the digital map information is employed to cross-check or verify results of a preliminary image recognition, which may be based upon the image data only.

In another mode of operation, the processing unit 130 may first determine the regions 390 in which the road edges 340 and road markings 330 are expected to be located. In the subsequent image recognition, portions of the image that are located outside regions 390 will be discarded, as is schematically indicated in the modified image 380 of FIG. 3c, in which these discarded regions are indicated with a diagonal line pattern.

Figure 8:
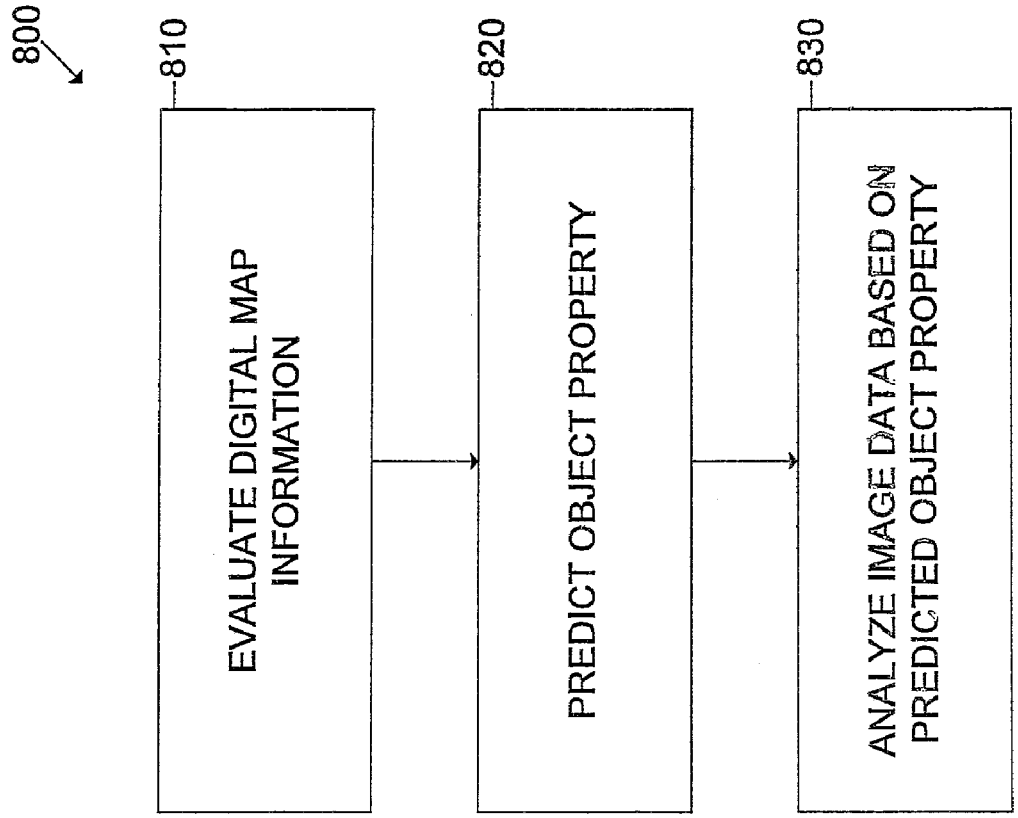
FIG. 8 is a flowchart that illustrates a method in which digital map information on an object is utilized to facilitate analysis of image data for object recognition according to another implementation.
Figure 9:
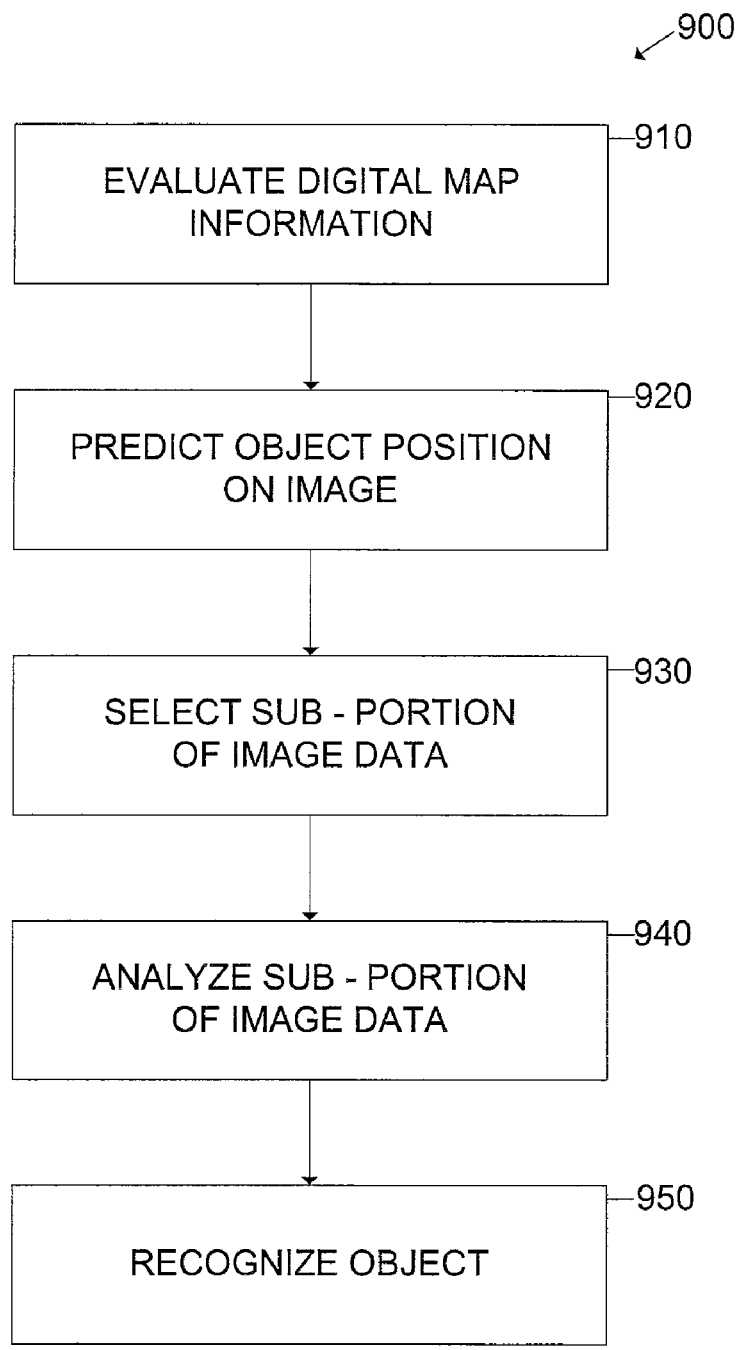
FIG. 9 is a flowchart that further illustrates a method of obtaining and utilizing digital map information to facilitate analysis of image data for object recognition according to an implementation of the method of FIG. 8.

It should be noted that the regions 390 in the example description above have distinct boundaries that may be considered "hard boundaries", i.e., all structures outside these regions are discarded. However, probability distributions in general may have no sharp cut-offs. Nevertheless, such distributions may also be used in determining the likelihood that a structure in the image having a specific position, shape or orientation is in fact the object to be identified. For example, the positions of structures such as road edges 340 or road markings 330 may be predicted based upon the positions of these objects in the digital map and the positions in the image may then be compared with the position in the digital map. Based upon this comparison, the structure might then be assigned a probability value such that the closer the position of the structure in the image is to the position determined from the digital map, the higher the assigned probability that the structure is in fact the object to be recognized. This assigning of probabilities may be employed in both example modes of operation (FIGS. 6 and 7) and the other mode of operation (FIGS. 8 and 9).

While the objects identified in the examples of modes of operation above were road edges 340 and road markings 330, other structures may also be identified including, for example road markings 320, the full road segment 360, or individual lanes of road segment 310 using the approach outlined above.

Even if available digital maps are not sufficiently accurate so as to provide detailed information on road segment width, such digital maps may nevertheless provide other road segment attributes that may advantageously be utilized for image recognition. For example, road segments typically have an attribute specifying a road segment type, such as highway or highway type or the number of lanes in each direction. While typically not allowing one to establish the precise width of the road segment, nevertheless, these road segment attributes may be utilized to obtain an estimate for width w.

FIG. 4 illustrates another example image 400 provided by the camera unit 140. FIG. 4a illustrates an example schematic image 400 that is recorded by camera unit 140 when the vehicle is traveling on a road segment 410 that includes a straight portion 420 and a bend 430. The corresponding digital map portion 440 is schematically shown in FIG. 4b, in which the digital map road segment 450, straight portion 460 and bend 470 are shown. The vehicle position 480 is schematically indicated. From the vehicle position 480 determined by the position and orientation determining unit 180 and the digital map information that includes information on the geometrical shape of the road 460, it is possible to determine the distance d of the vehicle from the bend. Since the digital map typically includes fairly accurate information as to the direction of the road along its longitudinal direction, the uncertainty in d is mainly due to the uncertainty in determining the vehicle position by the position and orientation determining unit 180. From the distance d and the position of the camera unit 140 relative to the vehicle, it is again possible to establish in which regions of image 400 the road edges of road segment 410 are to be expected. More specifically, it is possible to establish not only the regions in which the road edges of the straight portion 420 of road segment 410 are likely located, but to also establish in which regions of image 400 the road edges of the curved portion 430 are to be expected. Still further, with the curvature of bend 470 being known from digital map information, it is even possible to predict the shape of the road edges of curve section 430.

The image in FIG. 4 where road segments are not straight may also be evaluated by the two modes of operation outlined above in connection with the straight road segment of FIG. 3. More specifically, the digital map information 440 may be used to verify that a preliminarily identified road edge 420 or 430, that has been determined based only upon image data 400, has been correctly recognized with a specific probability. Alternatively or additionally, the digital map information, schematically indicated at 440, may also be used to identify regions of image data 400 that need to be analyzed thus facilitating image recognition.

The evaluation of image data, such as images 300 in FIG. 3 or 400 in FIG. 4, may also involve comparing structures found in these images to specific models. For example, a model of road edges of a straight section of a road segment may be a pair of essentially parallel lines having a distance corresponding to the width of the road segment. The distance between the road edges may be an unknown parameter that is established in the evaluation by analyzing the image data. Other model parameters for modeling the road edges of a straight road segment may include, for example, the direction of the road segment relative to the direction of view of camera unit 140, and an offset position of the road edges relative to camera unit 140.

From a practical stand point of implementation, recognizing road edges of a road segment in image data 300 and 400 may involve determining the set of parameters that optimally model the image data or, at least, provide a good approximation to the image data. For this purpose, a figure of merit describing the similarity of the model with the image data, may be determined for a specific set of parameters by sampling over many different sets of parameters. This may be facilitated by employing Bayes filtering also referenced as Bayesian filtering or particle filtering. It should be noted that, in such cases, the digital map information may provide natural constraints to the range of parameters that may be investigated. For example, the width w of the road segment in FIG. 3 or the distance d of the vehicle from the bend in FIG. 4 allow one to restrict the corresponding model parameters substantially to a small region in the vicinity of the vehicle.

While a straight road or straight road segments may be approximated by a pair of essentially parallel lines in the digital map representation, a curved road such as is shown in FIG. 4 may require complex modeling. In one example, a curved road may be approximated by a series of short and essentially straight road segment portions, the longitudinal axes of each of which may be tilted relative to one another. Alternatively, more complex models for curved roads may also be employed, for example, by approximating portions of the road as clothoid curves. Since the digital map information is employed to facilitate evaluating the image data, it may be suitable to select the type of model employed based upon the data format provided by the digital map. For example, if curved roads are stored in the form of a series of straight vectors, modeling the road as a series of straight road segment portions may be suitable, while, if the digital map uses a clothoid parameter format, modeling with clothoid curves may be used.

FIG. 5 illustrates yet another example image 500 of a road 510 on which the roadway along which the vehicle is traveling has a turnoff 520 as shown in FIG. 5a. The corresponding portion 530 of the digital map information is schematically shown in FIG. 5b. Various parameters that may be established from the digital map information in combination with the current vehicle position 560 are schematically indicated. The digital map road 540 and turnoff 550 are shown. Parameters that are relevant for identifying both roads in image data 500 may include the width w of road 540, the width $w_t$ of turnoff 550, the distance d from the vehicle position 560 to the turnoff 550, and the angle α at which the longitudinal axes of road 540 and turnoff 550 intersect at the position of the turnoff.

As discussed above in connection with FIGS. 3 and 4, parameters schematically indicated in the digital map portion 530 may advantageously be employed to facilitate the task of recognizing road edges in image data 500. This may be based upon either of the two example operation modes of the image recognition device 100 (FIG. 1), i.e., by cross-checking in which the digital map portion is utilized to verify correct object recognition or by prediction in which digital map portion is utilized to predict a feature of an object to facilitate object recognition.

Figure 6:
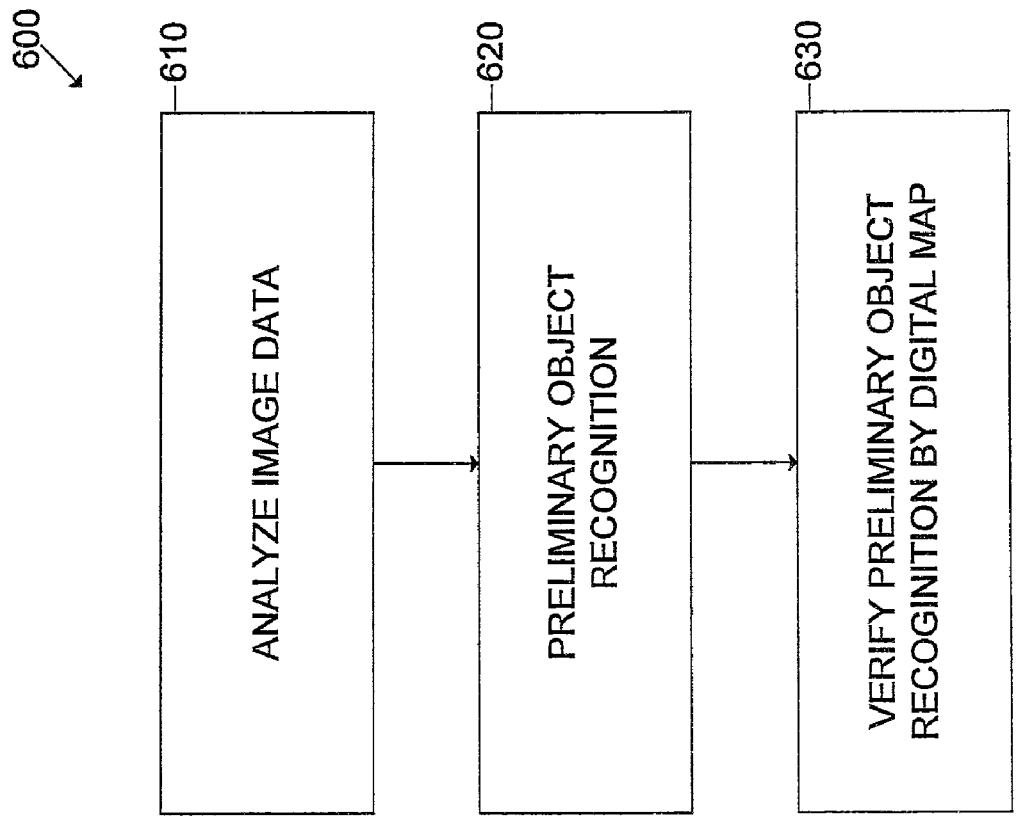
FIG. 6 is a flowchart that illustrates a method in which object recognition based upon image data is verified by digital map information according to an implementation.
Figure 7:
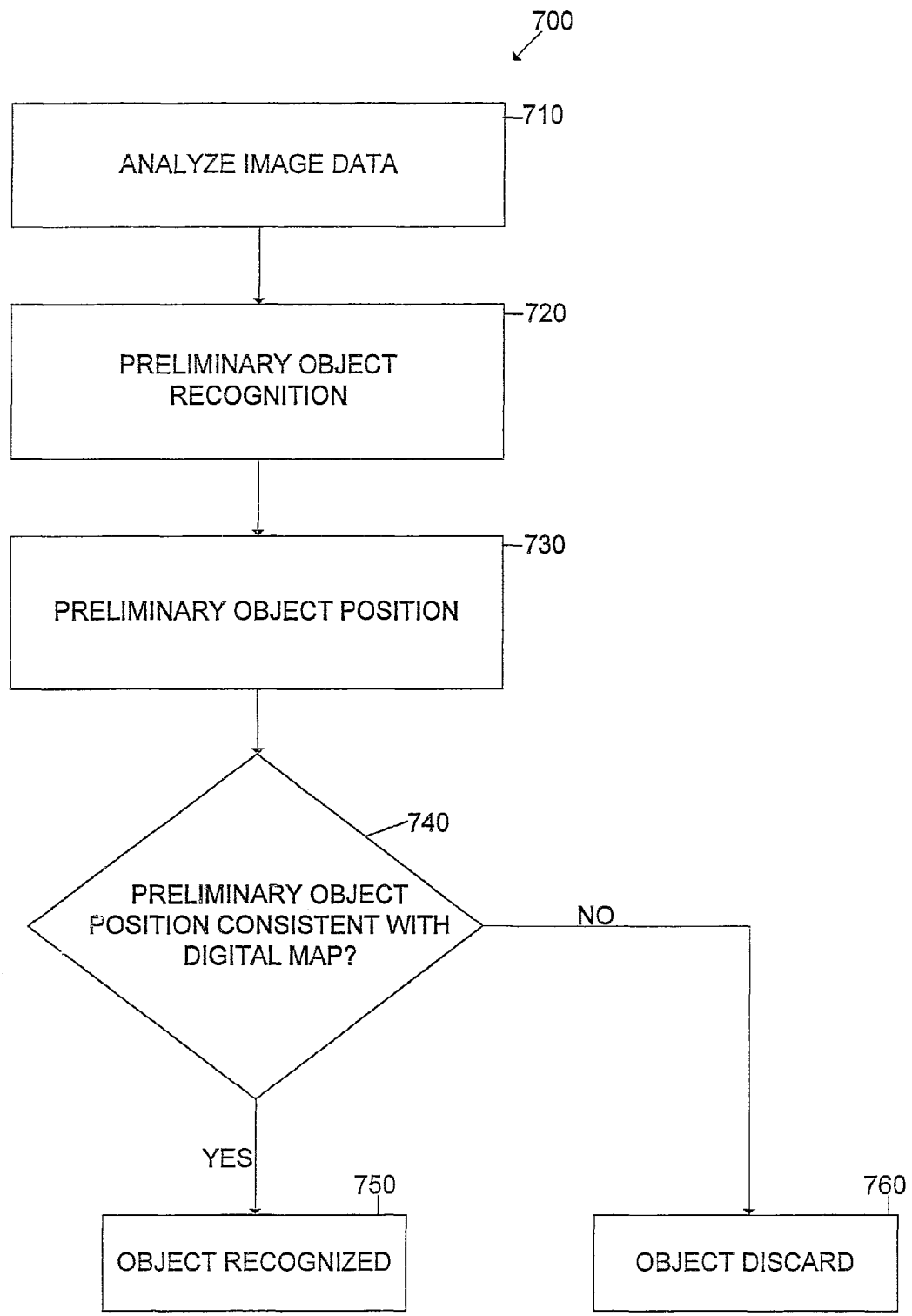
FIG. 7 is a flowchart that further illustrates a method of utilizing digital map information to verify object recognition based upon image data according to an implementation of the method of FIG. 6.

FIGS. 6 and 7 illustrate an example of one mode of operation, i.e., a first mode of operation, of the image recognition device 100 involving cross-checking in which the digital map portion is utilized to verify correct object recognition. The general method of object recognition 600 by this mode of operation is illustrated in FIG. 6. First, at step 610, the image data is analyzed in a conventional way as described above, leading to a preliminary object recognition at step 620. The analysis of image data at step 610 may include any method that may be employed in conventional image recognition devices. For example, the analysis may typically include filtering the image in various ways, including calculating a convolution of the image with, for example, a Laplace of Gaussian filter kernel or a Gaussian filter kernel, calculating color probability distributions, or applying the Canny-operator to the image. Subsequently, the parameters of a model for the object to be identified may be determined so as to establish the model that is most consistent with the image data. The latter step typically may involve calculating a figure of merit that quantifies whether a model having a specific set of parameters is consistent with the image data. The figure of merit may be calculated based upon one of or, typically, a combination of several cues that may be selected from a lane marker cue indicative of road markings, a road edge cue indicative of a road edge structure, a road color cue indicative of the typical road color, a non-road color cue indicative of image regions having colors different from the road color, a road width cue indicative of the road width and an elastic lane cue that is useful in forcing the vehicle onto the correct lane in a road having a plurality of lanes. Further, one of the cues may also be derived from a comparison of the predicted object position, shape or orientation, which has been established from the digital map, and of the position, shape or orientation of the structure in the image currently investigated, thereby assigning a probability to this structure. Once an acceptable set of parameters has been established, i.e., a set for which the corresponding model for the object to be identified is fairly consistent with the image data, a preliminary object recognition is performed at step 620. Preliminary image recognition by the methods described above terminate at step 620. The preliminary object recognition is then verified by comparison with digital map information at step 630.

FIG. 7 illustrates a method 700 corresponding to the method 600 of FIG. 6, in which an example of one implementation of a verifying step is shown in greater detail. In this example implementation, cross-checking is performed to determine whether the position of the preliminarily recognized object is consistent with digital map information. The steps 710 and 720 of analyzing image data and preliminary object recognition correspond to steps 610 and 620, respectively of FIG. 6. Next, at step 730, the object position of the preliminarily recognized object is determined. For some larger or extended objects, this step may include determining the area covered by the preliminarily recognized object. At step 740, processing unit 130 of the image recognition device 100 may verify whether the preliminary object position is consistent with information in the digital map. For this purpose, the processing unit 130 determines in which regions of the image the object is expected to be located. An example of this was discussed above in connection with FIG. 3 where the regions in which road edges 340 and road markings 330 would be expected are schematically indicated at 390 in FIG. 3c.

Once the comparison is made to determine whether the object position is consistent with the digital map, if the object position is found to be consistent with the digital map information, the object is verified and recognized at step 750. Subsequently, the verified object recognition may then be output, for example, to navigation system 120. On the other hand, if the position of the preliminarily recognized object is inconsistent with information in the digital map, the preliminarily recognized object is discarded at step 760. In this case, the image may be re-analyzed, i.e., process 700 may be started again. By cross-checking the results of preliminary object recognition that is based upon image data only with digital map information, the probability of incorrectly identifying an object in the image may be reduced, thus enhancing image recognition accuracy.

It should be noted that, although the cross-checking is discussed above with reference to the object position, other parameters may also be employed for cross-checking preliminarily recognized objects with digital map information. For example, the width of the road determined from image data may be compared with corresponding information stored in the digital map information. Such digital map information may include direct information on road width or information on road type, which may allow one to estimate road width.

FIGS. 8 and 9 illustrate another mode of operation of the image recognition device 100, i.e., a second mode of operation, in which digital map portion is utilized to predict a feature of an object to facilitate object recognition. The general method of object recognition 800 by this mode of operation is illustrated in FIG. 8. First, at step 810, digital map information is evaluated to predict a property of an object to be identified at step 820. The object property may be one or a combination of several of a variety of properties, including, for example, the position of the object in the image, the shape of the object in the image, or the orientation of the object in the image or any other suitable property of the object to be identified. If the analysis of the image data is based upon fitting a model of the object to the image data, the object property may also serve as a prediction for one of the parameters of the model. Subsequently, at step 830, the image data is analyzed based upon the predicted object property. The specific implementation of step 830 will be dependent upon the object property that is predicted at step 820, and the method generally used for image data analysis.

FIG. 9 illustrates a method 900 corresponding to the method 800 of FIG. 8, in which an example of one implementation of analysis of the image data based upon a predicted object property is shown in greater detail. According to this method, the object to be recognized in the image is identified in the digital map, and information corresponding to the object is extracted from the digital map information at step 910. Based upon this information, the position of the object on the image is predicted at step 920. For a larger or extended object, such as a lane marker or a road edge, the prediction of the object position may include identifying an extended region or area in the image in which the object is likely to be found. Based upon the predicted object position, at step 930, a sub-portion of the image data is selected for subsequent analysis. The sub-portion of the image data corresponds to the portion of the image in which the object is likely to be located. An example of this is discussed above in connection with FIG. 3, where these regions are schematically indicated at 390. At step 940, the sub-portion of the image data that has been selected at step 930 is analyzed to recognize the object at step 950. The result of the image recognition, i.e., the precise position and type of the recognized object, may subsequently be output to other devices, such as navigation system 120.

In the method shown schematically in FIGS. 8 and 9, the digital map information is employed to facilitate a subsequent analysis of the image data. In this way, not only the accuracy, but also the speed of the image recognition task may be improved.

While in the example implementation of the method of FIG. 9 the object position in the image is predicted to facilitate image data analysis, the operation of the image recognition device 100 is not restricted to prediction based upon object position. As indicated above, other object properties, such as the shape and/or orientation of the object or an object boundary may also be employed to facilitate image recognition. For example, as shown in FIG. 5, even when the distance d of the vehicle from the road turnoff is not precisely known, the information included in the digital map and the vehicle position allows the processing unit 130 to establish an angular range in which the direction of the road marking of road 520 is likely to be located. The image data may then subsequently be analyzed to identify structures having such orientation. In cases in which the analysis of the image data is again based upon fitting a model to the image data, information on the object extracted from the digital map information may be used to restrict the range of possible model parameters. For example, for the situation shown schematically in FIG. 5, information on the distance d from the road turnoff, the angle $\alpha$ of the road turnoff, and the width $w_r$ of road 520 may all be employed to restrict corresponding parameters that are used for modeling the road edges of turnoff 520 in image 500.

It should be emphasized that, although the method of FIG. 9 may base the prediction on the object position to facilitate the analysis of the image data, a combination of object parameters may also be employed for this purpose. For example, the digital map information may allow the processing unit 130 of image recognition device 100 to both predict an object position on the image and a likely shape of the object as well. In this case, the analysis of image data may not only be restricted to a sub-portion of the image data, but may further be restricted to objects located within this sub-portion and having specific shapes.

The above explanations with reference to FIGS. 3-9 have been based upon the assumption that the area or region that corresponds to the area shown in the image is known. Identifying such a relevant portion of a digital map is one of the standard features of navigation systems. More specifically, based upon the output of the position and orientation determining unit 180, the processing unit 160 may be adapted to determine the relevant portion of the digital map that corresponds to a neighborhood of the vehicle. Further, the orientation of the vehicle relative to the map may also be established automatically, since the navigation system may check the motion of the vehicle. Alternatively, a separate compass device may be provided for this purpose. Based upon the vehicle orientation, the relevant map portion that corresponds to the field of view of camera unit 140 may be selected and, for example, stored in the memory unit 150 of the image recognition device 100. Further, the results of image recognition may be output from image recognition device 100 to the navigation system 120 to facilitate various navigation functionalities.

Figure 10:
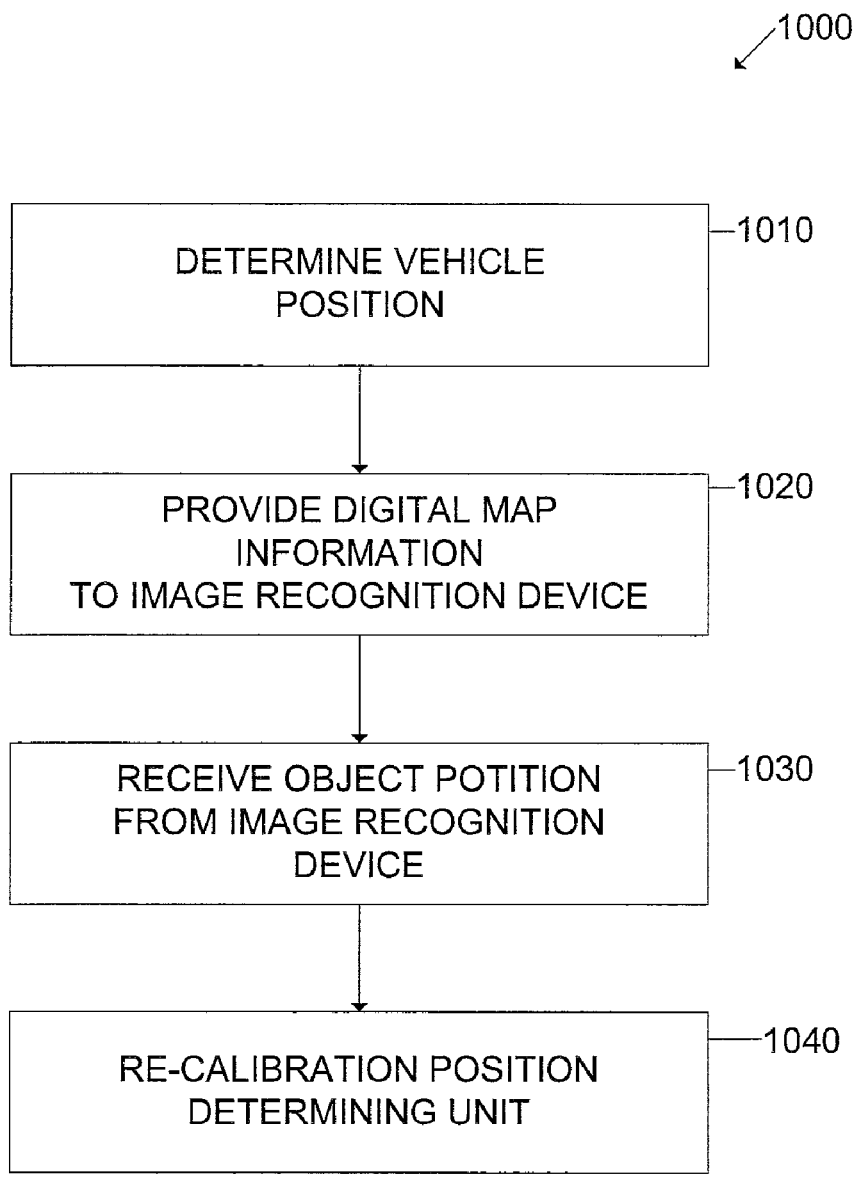
FIG. 10 is a flowchart that illustrates a method for improving position determining accuracy in a navigation system according to an implementation.

FIG. 10 illustrates a method 1000 in which an image recognition device 100 may be employed to improve the accuracy with which vehicle position is determined by navigation systems. Navigation systems may employ a position and orientation determining unit 180 to determine vehicle position and such position and orientation determining unit 180 may include, for example, a GPS receiver and/or a gyroscopic device. A more precise way of determining vehicle position might, however, be possible based upon analysis of the image data for close-by objects and this may be used in determining the distance of such objects from the current vehicle position.

For example, with reference to FIG. 5, once the road turn-off 520 has been recognized using one of the methods explained in connection with FIGS. 6-9 above, a value of the distance of the vehicle 560 from the road turnoff 520 may be established based upon the recognized turnoff 520. The relative position may be fed back into the navigation system 120 (FIG. 1). By comparison of the distance established from digital map information and the output of the position and orientation determining unit 180 with the distance established based on image data, the position and orientation determining unit 180 may be recalibrated. This method, generally indicated at 1000, is shown schematically in FIG. 10. First, at step 1010, the position and orientation determining unit 180 of the navigation system 120 determines a current vehicle position, and the navigation system 120 provides digital map information selected based on the current vehicle position to the image recognition device at step 1020. The image recognition device 100 (FIG. 1) then identifies an object in the image according to one of the methods described above, and provides the object position to the navigation system 120, which then receives the information at step 1030. Finally, at step 1040, the position determined by navigation system 120 may be recalibrated based upon the input of the image recognition device.

The image recognition device illustrated in FIG. 1 may be modified in a variety of ways. For example, the image recognition device 100 of the present invention may be a modular device that includes its own processing unit 130 and memory unit 150 as well as camera unit 140. However, several of the resources required by the image recognition device 100 may also be shared with other systems or devices used in automotive environments. For example, the processing unit 130 may be adapted to access a memory unit of the navigation system 120, in which case it is not necessary to provide a separate memory unit 150 or storage unit 170 in the image recognition device. Further, the memory unit could also be partially integrated with the camera unit 140, i.e., the portion of the memory unit that stores image data could be a part of the camera unit 140. Still further, the image recognition device does not necessarily have to be a separate device, but may also be fully integrated, for example, with the navigation system 120. In this case, the processing unit 160 of the navigation system may be adapted to perform both standard navigation tasks and image recognition tasks.

While the discussion above describes the recognition of objects such as roads or structures that are related to roads in an image, the invention is also applicable to the recognition or identification of any structure for which information is provided in the digital map information such as, for example, buildings. Further, while image recognition for navigation systems in vehicles is anticipated to be one field of application, the invention is not restricted to this field. Rather, it may be applied to any situation in which objects are to be recognized in an image and map information corresponding to at least a portion of the image is available.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 3-10 may be performed by hardware and/or software. Additionally, a image recognition system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method for recognizing an object in an image of an area, the method comprising:
    retrieving image data captured by an imaging device, the image data corresponding to the image of the area;
    retrieving digital map information, where the digital map information includes map information on at least a portion of the area represented by the image and where the digital map information includes information on the object;

comparing the image data and the digital map information to recognize the object; and performing a navigation function for assisting a driver based on the recognized object.

2. The method of claim 1 further comprising:

analyzing the image data to preliminarily recognize the object before comparing with the digital map information to verify that the object has been correctly recognized.

3. The method of claim 1, where the information on the object includes information on at least one of a position, a shape, or an orientation of the object, the method further comprising:

determining at least one of a position, a shape, or an orientation of the object from the image data, where the step of comparing the image data and the digital map information includes comparing at least one of a position, a shape, or an orientation, of the object determined from the image data with the corresponding digital map information.

4. The method of claim 1, where the step of comparing the image data and the digital map information includes evaluating the digital map information to obtain information on the object and utilizing that information in evaluating the image data in order to facilitate recognition of the object in the image data.

5. The method of claim 1, where the step of comparing the image data and the digital map information includes utilizing the digital map information to predict at least one of a position, a shape, or an orientation, of the object in the image and where evaluating the image data includes assigning a probability, based upon the predicted at least one of a position, a shape, or an orientation of the object, that a structure having a specific position, shape or orientation in the image is the object to be recognized.

6. The method of claim 1, where the information on the object includes information on the position of the object and where the step of comparing the image data and the digital map information includes evaluating a sub-portion of the image data selected based upon the information on the position of the object.

7. The method of claim 6, where the information, on the object includes information on either or both of shape and orientation of the object and where the step of comparing the image data and the digital map information includes evaluating identifying objects based upon information on either or both of shape and orientation of the object.

8. The method of claim 1, where the step of comparing the image data and the digital map information includes comparing a model of the object with the image data.

9. The method of claim 8, where the model of the object has at least one variable parameter, and the step of comparing the image data and the digital map information includes finding an optimum value for the at least one variable parameter.

10. The method of claim 9, where the finding the optimum value for the at least one variable parameter includes Bayes filtering or particle filtering.

11. The method of claim 1, where the digital map information is retrieved from a navigation system.

12. The method of claim 1 further comprising:

determining a current vehicle position and where the retrieving digital map information is based upon the current vehicle position.

13. The method of claim 12 further comprising:

determining a current vehicle orientation and where the retrieving digital map information is based on the current vehicle orientation.

14. The method of claim 1 further comprising:

recording the image, where the image shows an area in the vicinity of a vehicle.

15. The method of claim 1 further comprising:

providing a result of the step of comparing the image data and the digital map information to a navigation system.

16. The method of claim 15 further comprising:

providing driving instructions to a driver, or alerting a driver, or controlling a vehicle based upon a result of the step of comparing the, image data and the digital map information.

17. The method of claim 1, where the object is a road, a road lane, a lane marker, a road edge, a road intersection, or a road turnoff or a traffic sign.

18. An image recognition device for recognizing an object in an image of an area, comprising:

at least one memory unit that stores image data captured by an imaging device, the image data corresponding to the image and that stores digital map information, where the digital map information includes map information on at least a portion of the area represented by the image and where the digital map information includes information on the object;

a processing unit coupled to the at least one memory unit, where the processing unit compares the image data and the digital map information to recognize the object; and an interface to a navigation system configured to use information about the object to perform navigation functions.

19. The image recognition device of claim 18, where the processing unit analyzes the image data to preliminarily recognize the object and comparing with the digital map information to verify that the object has been correctly recognized.

20. The image recognition device of claim 18, where the information on the object includes information on at least one of a position, a shape, or an orientation of the object and where the processing unit evaluates the image data to recognize the object, determines at least one of a position, a shape, or an orientation of the object from the image data, and compares the at least one of a position, a shape, or an orientation of the object determined from the image data with said the corresponding digital map information.

21. The image recognition device of claim 18, where the processing unit utilizes the digital map information to facilitate evaluating the image data to recognize the object.

22. The image recognition device of claim 18, where the processing unit utilizes the digital map information to predict at least one of a position, a shape, or an orientation of the object in the image and where the processing unit evaluates the image data assigning a probability, based upon the predicted at least one of a position, a shape or an orientation of the object, that a structure having a specific position, shape or orientation in the image is the object to be recognized.

23. The image recognition device of claim 18, where the information on the object includes information on the position of the object and where the processing unit evaluates a sub-portion of the image data selected based upon the information on the position of the object.

24. The image recognition device of claim 22, where the information on the object includes information on either or both of the shape and orientation of the object and where the processing unit evaluates the image data based upon the information on the shape or orientation of the object.

25. The image recognition device of claim 18, where the processing unit compares a model of the object with the image data to recognize the object.

26. The image recognition device of claim 25, where the model of the object has at least one variable parameter, and the processing unit finds an optimum value for the at least one variable parameter.

27. The image recognition device of claim 26, where the processing unit employs a Bayes filter or a particle filter to find the optimum value for the at least one variable parameter.

28. The image recognition device of claim 18 further comprising:
a position and orientation determining unit configured to determine a current vehicle position where the processing unit is configured to select a portion of the digital map information based upon the current vehicle position.

29. The image recognition device of claim 28, where the device includes:
an orientation determining unit configured to determine a current vehicle orientation, where the processing unit is configured to select a portion of the digital map information based upon the current vehicle orientation.

30. The image recognition device of claim 18, where the imaging device includes:
a camera unit for recording the image, the camera unit being configured to provide the image to the memory unit.

31. A navigation system, comprising:
an image recognition device having:
at least one memory unit for storing image data corresponding to an image of an area and for storing digital map information, where the digital map information includes map information on at least a portion of an area represented by the image and where the digital map information includes information on the object; and
a processing unit coupled to the at least one memory unit, where the image data and the digital map information are compared to recognize the object; and
a storage unit for storing a digital map, where the image recognition device is configured to retrieve at least a portion of the digital map from the storage unit.

32. The navigation system of claim 31 further comprising:
an optical or acoustical output unit for outputting driving instructions or warning signals to a driver, where the driving instructions or warning signals are dependent upon the object recognized by the image recognition device.

33. The navigation system of claim 31 further comprising:
a position and orientation determining unit configured to determine a current vehicle position and to provide information to the processing unit to identify the relevant map portion for recognition of the object and object position, where the processing unit further determines the distance of the vehicle from the object.

34. A navigation system and image recognition device assembly, comprising:
a position determining device that determines a position of the device; and
an image recognition device configured to analyze image data captured by an imaging device and digital map information to recognize an object in an image of an area represented by the image data, the image recognition device being configured to provide information on a relative position of the object to the position determining device.

35. The navigation system and image recognition assembly of claim 34, where the position determining device outputs information on a current vehicle position to the image recognition device.

36. The navigation system and image recognition device assembly of claim 35, where the position determining device includes a control circuit configured to recalibrate the position determining device based upon the information on the relative position.

* * * * *

UNITED STATES PATENT AND TRADEMARK OFFICE
CERTIFICATE OF CORRECTION

| | | |
|---|---|---|
| PATENT NO. | : 8,311,274 B2 | Page 1 of 1 |
| APPLICATION NO. | : 11/849641 | |
| DATED | : November 13, 2012 | |
| INVENTOR(S) | : Stephan Bergmann and Ulrich Mohr | |

It is certified that error appears in the above-identified patent and that said Letters Patent is hereby corrected as shown below:

Column 17
Line 18, please delete "orientation," and insert -- orientation --

Column 17
Line 30, please delete "orientation," and insert -- orientation --

Column 17
Line 42, please delete "information," and insert -- information --

Column 18
Line 10, please delete "the," and insert -- the --

Signed and Sealed this
Fifteenth Day of January, 2013

David J. Kappos
*Director of the United States Patent and Trademark Office*